D. A. CLARK.
INSECT EXCLUDING ATTACHMENT FOR BUILDINGS.
APPLICATION FILED JAN. 17, 1912.

1,080,417.

Patented Dec. 2, 1913.
2 SHEETS—SHEET 1.

Witnesses

Inventor
David A. Clark
By Victor J. Evans
Attorney

D. A. CLARK.
INSECT EXCLUDING ATTACHMENT FOR BUILDINGS.
APPLICATION FILED JAN. 17, 1912.

1,080,417.

Patented Dec. 2, 1913.

2 SHEETS—SHEET 2.

Witnesses
H. H. Lybrand
P. H. Hoster

Inventor
David A. Clark
By Victor J. Evans
Attorney

COLUMBIA PLANOGRAPH CO., WASHINGTON, D. C.

UNITED STATES PATENT OFFICE.

DAVID A. CLARK, OF CAPAY, CALIFORNIA.

INSECT-EXCLUDING ATTACHMENT FOR BUILDINGS.

1,080,417. Specification of Letters Patent. Patented Dec. 2, 1913.

Application filed January 17, 1912. Serial No. 671,557.

*To all whom it may concern:*

Be it known that I, DAVID A. CLARK, a citizen of the United States, residing at Capay, in the county of Yolo and State of California, have invented new and useful Improvements in Insect-Excluding Attachments for Buildings, of which the following is a specification.

An object of the invention is to provide an attachment for buildings for preventing insects, such as flies and the like from entering the building.

My invention embodies a structure, similar to the usual vestibule of a building and the mentioned structure is adapted to be attached adjacent the entrance to the building so that all persons desiring to enter the building or leave the same will pass through the mentioned structure, which is constructed to prevent flies from entering the building when a person enters the same or entering the building when a person is leaving the same.

For the purpose mentioned, use is made of a housing provided with a darkened chamber and a ventilating chamber, the mentioned chambers being adjacently connected by a door and the mentioned darkened chamber being provided with an entrance with insect receiving compartments provided within the housing and adapted to receive insects which attempt to enter the housing through suitable ventilating apertures, the mentioned fly receiving compartments being provided with removable covers and the mentioned housing being provided with trap doors for effectually closing the insect receiving compartments.

Reference is to be had to the accompanying drawings constituting a part of this specification, in which similar characters of reference denote corresponding parts in all the views, and in which—

Figure 1:
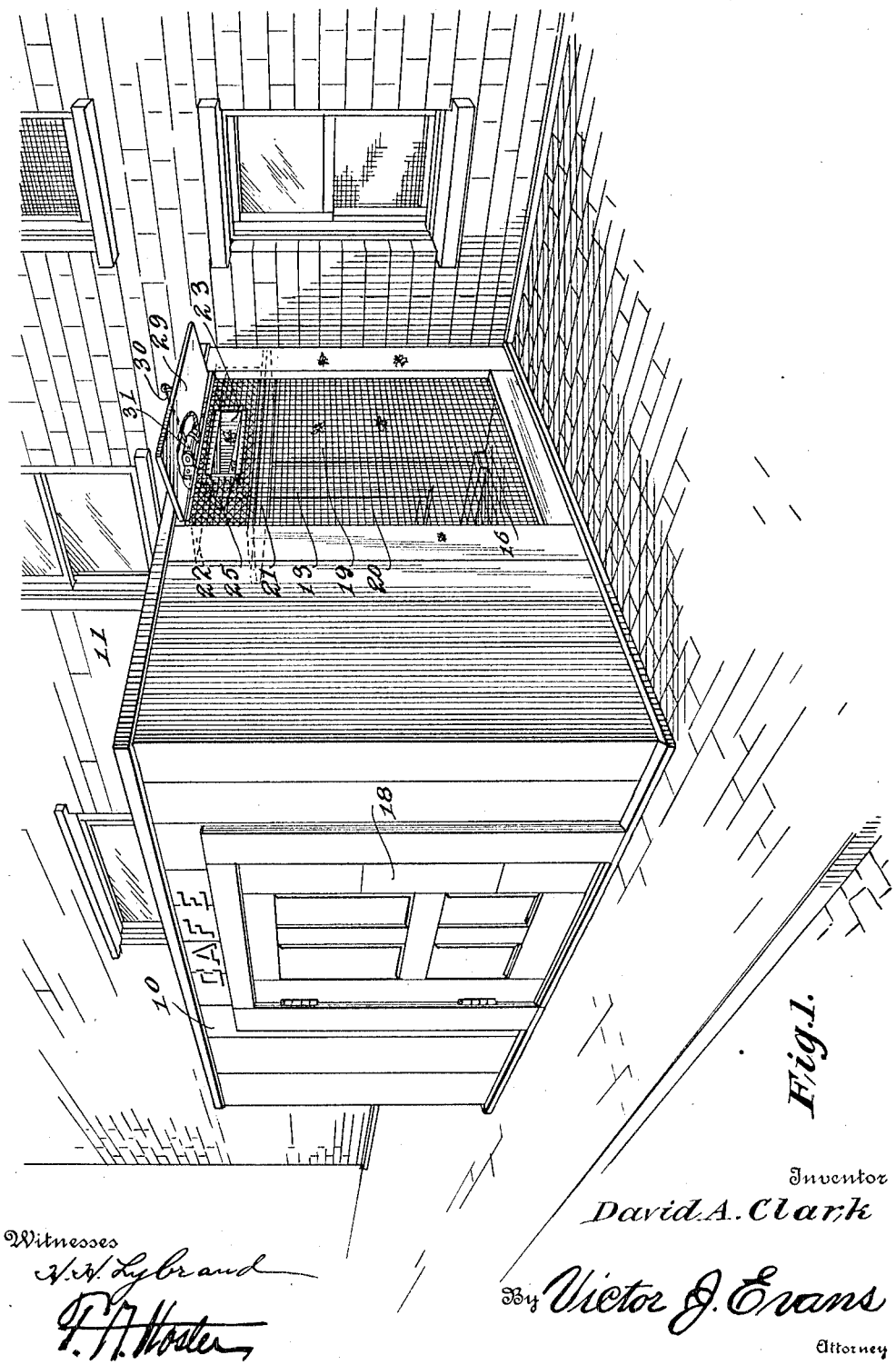
Figure 2:
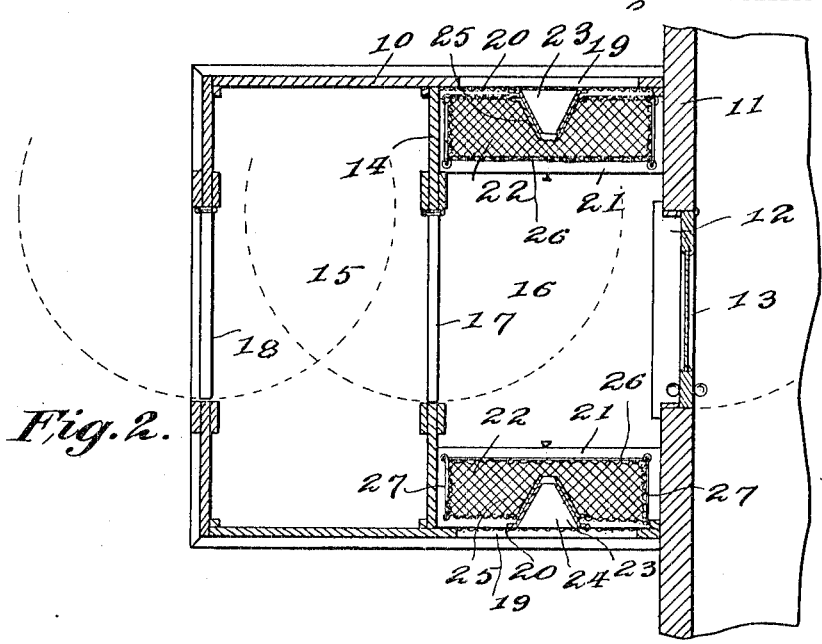
Figure 3:
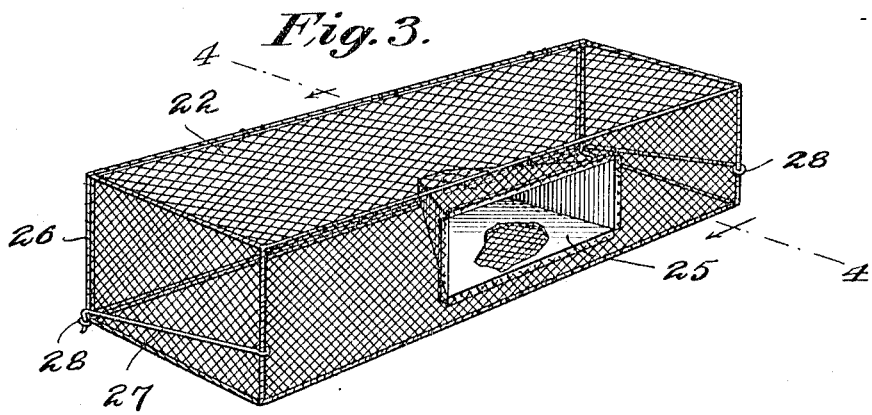
Figure 4:
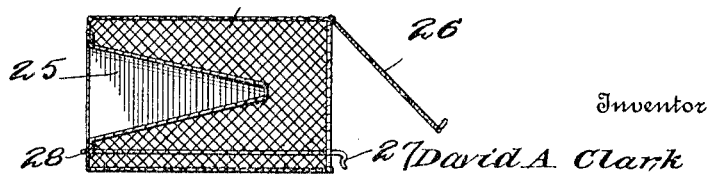

Figure 1 is a perspective view of my device, showing the same applied to a building. Fig. 2 is a horizontal sectional view taken immediately beneath the roof of the housing and showing the interior arrangement thereof. Fig. 3 is a perspective view of one of the insect receiving compartments, parts being broken away to disclose the underlying structure, and Fig. 4 is a vertical sectional view taken on the line 4—4 in Fig. 3, the cover of the insect receiving compartment being in open position.

Referring to the views and more particularly to Figs. 1 and 2 I provide a rectangular housing 10 for engagement with a dwelling 11, adjacent the main entrance 12 of the dwelling, the mentioned housing being positioned to cover the entrance, which is normally closed by a door 13 as shown in Fig. 2. The housing 10 is provided with a partition 14, forming a darkened chamber 15 and a ventilating chamber 16, a swinging door 17 being mounted on the partition 14 to normally close an opening therein, thus affording a means of access from one of the rooms 15, 16 to the other. At the front end of the housing 10 a door 18 is mounted to permit a person entering the darkened chamber 15 from the street or sidewalk and the walls of the chamber 15 are preferably painted black or darkened in some suitable manner for a purpose that will be hereinafter more fully disclosed.

The ventilating chamber 16 is provided with a plurality of openings 19, covered with screens 20 and extending transversely to the openings 19 near the upper ends thereof are guide beams 21 adapted to support insect receiving compartments 22, preferably constructed of screen wire and arranged in the ventilating chamber 16 to repose on the guides 21 and engage funnels 23 extending through the screens 20 to form openings 24, the inner ends of the funnels 23 terminating within the compartments 22.

As mentioned heretofore the compartments 22 are preferably constructed of screen wire and have extended through the front sides thereof funnels 25 which are adapted to receive the funnels 23 secured to the screens 20, thus permitting the insects which crawl up the outer sides of the screens 20 to enter the compartments 22 through the openings 24. Hingedly mounted on the rear ends of the compartments 22 are closures 26, normally retained in closed position by hooks 27 mounted on the compartments 22 and having their outer ends extended through eyelets 28 secured to the closures 26.

Pivotally mounted on the housing 10, exteriorly thereof and over the openings 19, are trap doors 29 having cords 30 connected thereto, the said cords being passed over pulleys 31 and extending within the ventilating chamber 16 for connection with suitable cleats or the like for retaining the trap doors 29 in raised position, the mentioned trap doors being mounted to close the openings 24 when the same are permitted to depend from the housing 10 as will be readily understood.

In the use of my device, when a person desires to enter the dwelling 11 he passes through the opening 18 into the darkened chamber 15 and as insects, such as flies and the like do not enter darkened chambers or rooms, when the person passes through the door 18 the flies or insects exterior of the housing will not enter through the door, which is preferably connected with a spring adapted to normally retain the door in closed position. The person now opens the door 17 and enters the ventilating chamber 16, from which he proceeds to open the door 13 and enter the dwelling 11. Thus it will be seen that any flies or other insects on the outside of the housing cannot enter the ventilating chamber 16 or the dwelling 11 when a person enters the dwelling in the manner described heretofore in view of the fact that the mentioned insects or flies normally will not enter the darkened chamber 15 when the door is opened.

By providing the openings 19, covered with the screens 20, a large amount of light is admitted in the ventilating room 16 thus also illuminating the entrance to the dwelling 11. Any flies or other insects, which settle or crawl up the screens 20 will pass through the openings 24 and into the compartments 22, it being understood that the inner ends of the funnels 25 are smaller than the outer ends thereof to prevent the flies which enter the compartments 22 from finding their way out of the compartments through the openings in the inner ends of the funnels 25. The compartments 22 are removably positioned on the guides 21 and can be removed therefrom for the purpose of opening the compartments 22 by removing the covers 26 to remove the captured flies or insects from the compartments. Before this is accomplished, however, the cords 30 are released from the cleats or securing hooks in the ventilating chamber 15 and the trap doors 29 are permitted to swing downwardly and close the openings 24, thus preventing any flies or insects from entering the chamber through the openings 24 after the compartments 22 have been removed from engagement with the guides 21 for the purpose of removing the captured insects from the compartments.

My device is preferably constructed and arranged similarly to the vestibules usually connected to dwellings in winter and from the foregoing description it will be readily seen that insects will be effectually prevented from entering the dwelling through the opening 12, normally closed by the door 13 and surrounded by the housing 10.

Although for the purpose of describing my insect excluding attachment, I have shown a particular construction thereof, it will be understood that I do not limit myself thereto nor to the particular description embodied herein, the scope of the invention being defined in the appended claim.

Having thus fully described the invention, what I claim as new is:—

In a device of the class described, the combination with a housing for attachment to a dwelling, of a darkened chamber and a fly screened ventilating chamber in the housing and separated by a partition supported therein, an entrance door for the said darkened chamber, and a door on the partition for connecting the darkened chamber with the said fly screened ventilating chamber.

In testimony whereof I affix my signature in presence of two witnesses.

DAVID A. CLARK.

Witnesses:
T. CRAIG,
R. O. ARMSTRONG, Sr.

---

Copies of this patent may be obtained for five cents each, by addressing the "Commissioner of Patents, Washington, D. C."